US010752183B2

United States Patent
Miyashita et al.

(10) Patent No.: US 10,752,183 B2
(45) Date of Patent: Aug. 25, 2020

(54) STACKED COMPOSITE INTERIOR PART

(71) Applicant: TOYODA IRON WORKS CO., LTD., Toyota-shi, Aichi (JP)

(72) Inventors: Osamu Miyashita, Toyota (JP); Kenichi Yoshida, Toyota (JP); Kenji Onuma, Toyota (JP); Takeshi Taniguchi, Toyota (JP); Masamori Hirose, Toyota (JP); Hideaki Sakai, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 298 days.

(21) Appl. No.: 15/520,885

(22) PCT Filed: Aug. 6, 2015

(86) PCT No.: PCT/JP2015/072428
§ 371 (c)(1),
(2) Date: Apr. 21, 2017

(87) PCT Pub. No.: WO2016/063598
PCT Pub. Date: Apr. 28, 2016

(65) Prior Publication Data
US 2017/0334370 A1    Nov. 23, 2017

(30) Foreign Application Priority Data
Oct. 24, 2014   (JP) .................................. 2014-217831

(51) Int. Cl.
*B32B 3/30*   (2006.01)
*B60R 13/02*  (2006.01)
(Continued)

(52) U.S. Cl.
CPC ............ *B60R 13/0243* (2013.01); *B32B 1/00* (2013.01); *B32B 3/06* (2013.01); *B32B 3/28* (2013.01);
(Continued)

(58) Field of Classification Search
CPC ................ B60R 13/02; B60R 13/0212; B60R 2021/0293; B60R 2021/0407;
(Continued)

(56) References Cited

U.S. PATENT DOCUMENTS

RE24,805 E  *  3/1960  Morrill, Jr. ............... B60N 2/14
                                                        297/226
2010/0264680 A1* 10/2010 Ishikawa ............. B60R 21/0428
                                                         296/1.09
(Continued)

FOREIGN PATENT DOCUMENTS

EP    2 930 015 A1    10/2015
EP    2 998 109 A1    3/2016
(Continued)

OTHER PUBLICATIONS

Search Report in European Application No. 15852462.9 dated Apr. 12, 2018.

*Primary Examiner* — Megha M Gaitonde
(74) *Attorney, Agent, or Firm* — Finnegan, Henderson, Farabow, Garrett & Dunner, LLP

(57) ABSTRACT

A laminated composite interior part includes a first member made of synthetic resin and having a mating surface; and a second member made of elastically deformable synthetic resin and having a plate portion substantially parallel to the mating surface. The plate portion has integrally-formed and interspersed protrusions protruding toward the mating surface. The second member is placed on the first member with distal end portions of the protrusions being in contact with (Continued)

the mating surface. Cushioning properties are provided by elastic deformation of the protrusions, caused as the protrusions' distal end portions are relatively pressed against the mating surface. Flexural rigidity of each of the protrusions against a compressive load is anisotropic about its axis, so that the protrusion is flexurally deformed in one direction about its axis with the distal end portion thereof sliding on the mating surface. Surface roughness of the mating surface is less than 0.20.

6 Claims, 10 Drawing Sheets

(51) Int. Cl.
*B32B 1/00* (2006.01)
*B32B 27/30* (2006.01)
*B32B 27/36* (2006.01)
*B32B 3/28* (2006.01)
*B32B 7/02* (2019.01)
*B32B 27/12* (2006.01)
*B32B 3/06* (2006.01)
*B32B 27/08* (2006.01)
*B32B 27/32* (2006.01)
*B32B 7/05* (2019.01)
*B32B 27/06* (2006.01)

(52) U.S. Cl.
CPC .............. *B32B 3/30* (2013.01); *B32B 7/02* (2013.01); *B32B 7/05* (2019.01); *B32B 27/06* (2013.01); *B32B 27/08* (2013.01); *B32B 27/12* (2013.01); *B32B 27/302* (2013.01); *B32B 27/304* (2013.01); *B32B 27/32* (2013.01); *B32B 27/36* (2013.01); *B32B 2307/412* (2013.01); *B32B 2307/51* (2013.01); *B32B 2307/536* (2013.01); *B32B 2307/546* (2013.01); *B32B 2307/56* (2013.01); *B32B 2307/706* (2013.01); *B32B 2307/734* (2013.01); *B32B 2605/00* (2013.01); *B32B 2605/003* (2013.01); *B32B 2605/08* (2013.01); *B60R 13/02* (2013.01); *B60R 13/0206* (2013.01)

(58) Field of Classification Search
CPC ... B60R 2021/0442; B60R 21/04; B32B 3/10; B32B 3/12; B32B 3/14; B32B 3/16; B32B 3/18; B32B 7/04; B32B 7/12; B32B 7/005; B32B 7/045; B32B 27/06; A42B 3/064; A42B 3/121; A42B 3/125; A63B 71/10; Y10T 428/24174; Y10T 428/24496; Y10T 428/24504; A46B 9/02; A46B 9/025; A46B 9/04; A46B 9/06
USPC ........ 428/101, 105, 112, 114, 116, 156, 159, 428/163, 167, 169, 172, 174, 175, 178, 428/179, 195.1, 212, 213; 188/371–377; 2/411–425; 36/28.35 R, 37; 297/219.1–229, 452.48–452.62; 296/97.23, 153; 267/117, 119, 120, 267/142–146
See application file for complete search history.

(56) References Cited

U.S. PATENT DOCUMENTS

| 2015/0072105 A1 | 3/2015 | Miyashita et al. |
| 2015/0290904 A1 | 10/2015 | Miyashita et al. |
| 2015/0306842 A1 | 10/2015 | Miyashita |

FOREIGN PATENT DOCUMENTS

| EP | 3 045 305 A1 | 7/2016 |
| EP | 3 127 751 A1 | 2/2017 |
| EP | 3 150 441 A1 | 4/2017 |
| WO | WO 2013/132677 A1 | 9/2013 |
| WO | WO 2014/083862 A1 | 6/2014 |
| WO | WO 2014/087678 A1 | 6/2014 |

\* cited by examiner

STACKED COMPOSITE INTERIOR PART

CROSS-REFERENCE TO RELATED APPLICATIONS

This application is a national phase application of International Application No. PCT/JP2015/072428, filed Aug. 6, 2015, and claims the priority of Japanese Application No. 2014-217831, filed Oct. 24, 2014, the content of both of which is incorporated herein by reference.

TECHNICAL FIELD

The present invention relates to laminated composite interior parts, and more particularly to an improvement in laminated composite interior parts having cushioning properties due to elastic deformation of multiple protrusions.

BACKGROUND ART

Laminated composite interior parts are known which have (a) a first member made of a synthetic resin and having a mating surface, and (b) a second member which is made of an elastically deformable synthetic resin, and which has a plate portion substantially parallel to the mating surface, the plate portion provided with multiple protrusions which are formed integrally therewith to be interspersed on the plate portion, and which protrude toward the mating surface such that the plate portion and the mating surface cooperate to define a space between the plate portion and the mating surface, and the second member being placed on the first member with distal end portions of the protrusions being in with contact the mating surface, and the laminated composite interior part having (c) cushioning properties provided by elastic deformation of the protrusions, which is to be caused as the distal end portions of the protrusions are relatively pressed against the mating surface (see Patent Document 1).

RELATED ART DOCUMENTS

Patent Documents

Patent Document 1: International Publication WO 2013/132677

SUMMARY OF THE INVENTION

Problem to be Solved by the Invention

In such conventional laminated composite interior parts, abnormal noise is generated in some cases when the parts are pressed with a finger or hand.

The present invention was developed in view of the above circumstances, and it is an object of the present invention to restrain abnormal noise from being generated in a laminated composite interior part having cushioning properties due to elastic deformation of multiple protrusions when the laminated composite interior part is pressed with a finger or hand.

Solution to the Problem

To achieve the above object, a first aspect of the invention provides a laminated composite interior part, comprising (a) a first member made of a synthetic resin and having a mating surface, and (b) a second member which is made of an elastically deformable synthetic resin and which has a plate portion substantially parallel to the mating surface, the plate portion being provided with multiple protrusions which are formed integrally with the plate portion to be interspersed on the plate portion, and which protrude toward the mating surface such that the plate portion and the mating surface cooperate to define a space between the plate portion and the mating surface, and the second member being placed on the first member with distal end portions of the protrusions being in contact with the mating surface, and (c) the laminated composite interior part having cushioning properties provided by elastic deformation of the protrusions, which is to be caused as the distal end portions of the protrusions are relatively pressed against the mating surface, characterized in that (d) flexural rigidity of each of the protrusions against a compressive load is anisotropic about its axis, so that the protrusion is flexurally deformed in one direction about its axis with the distal end portion thereof sliding on the mating surface, and (e) surface roughness Ra of the mating surface is less than 0.20.

The surface roughness Ra is arithmetic mean roughness defined in JIS. The expression "about the axis" of the protrusion means about the axis in a direction normal to the plate portion located at the base end portion of the protrusion.

A second aspect of the invention provides the laminated composite interior part recited in the first aspect of the invention, characterized in that the protrusion has an asymmetrical longitudinal section, and the protrusion is flexurally deformed while sliding in the one direction determined according to the asymmetrical shape when the distal end portion thereof is pressed against the mating surface.

A third aspect of the invention provides the laminated composite interior part recited in the first or second aspect of the invention, characterized in that the protrusion has its centerline tilted with respect to a direction normal to the plate portion located at a base end of the protrusion, and the protrusion is flexurally deformed while sliding to a side to which the centerline is tilted.

Advantageous Effects of the Invention

The inventors found that, when the distal end portions of the protrusions are flexurally deformed while sliding on the mating surface, the protrusions are flexurally deformed while intermittently slipping due to stick-slip that is caused by friction between the mating surface and the protrusions, whereby abnormal noise is generated. The inventors also found that, by causing each protrusion to be flexurally deformed in one direction about its axis and making the surface roughness Ra of the mating surface less than 0.20, the friction between the mating surface and the protrusions is reduced and the protrusions smoothly slide in the one direction.

Generation of Abnormal Noise Due to Stick-Slip can Thus be Effectively Restrained.

In the second aspect of the invention, the protrusion has an asymmetrical longitudinal section, and the protrusion is flexurally deformed while sliding in the one direction determined according to the asymmetrical shape. Moreover, since the surface roughness Ra of the mating surface is less than 0.20, the protrusions smoothly slide in the one direction.

The third aspect of the invention is the case where the protrusions are tilted with respect to the direction normal to the plate portion. In this case, the protrusions are more reliably flexurally deformed while sliding in the one direction, namely the direction in which the protrusions are tilted. Moreover, since the surface roughness Ra of the mating surface is less than 0.20, the protrusions more smoothly slide in the one direction, and generation of abnormal noise can be more stably restrained.

BRIEF DESCRIPTION OF DRAWINGS

FIG. 4A is a plan view of the fine protrusions in a size close to their actual size, and FIG. 4B is an enlarged plan view of a central portion IVb in FIG. 4A.

MODES FOR CARRYING OUT THE INVENTION

Figure 1:
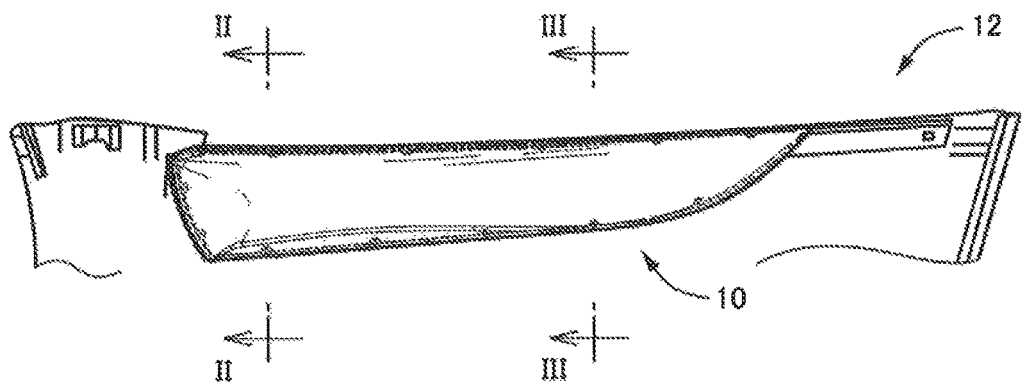
FIG. 1 is a schematic view showing the upper end of a vehicle door trim having an ornament according to an embodiment of the present invention, as viewed from the design surface side (the interior side).

The present invention is applied to vehicle interior parts such as a door trim, a luggage side trim, and an instrument panel, and ornaments etc. that are attached to the interior parts, but is also applicable to panel parts for applications other than vehicle applications. The present invention is applicable not only to plate-shaped panel parts but also to three-dimensional parts in which the second member is placed on the surface of the first member or a base member that is curved three-dimensionally to have a three-dimensional shape. In the case of using the first member as the base member, relatively hard synthetic resin materials are preferably used such as rigid polyvinyl chloride, polypropylene, polyethylene, and ABS. In the case of using the first member as a surface layer member, or for the resin material of the second member, various thermoplastic resins are preferably used such as soft polyvinyl chloride, styrene resin, olefin resin, and polyester resin. A surface member may further be bonded to the surface layer member. For example, not only various thermoplastic resins such as soft polyvinyl chloride, styrene resin, olefin resin, and polyester resin but also various surface materials such as woven fabric, nonwoven fabric, knitted fabric, vinyl chloride, a flexible film can be used as the surface member. In the case of using the first member as the surface layer member, a relatively hard base member may be disposed on the back surface side (the opposite side from the protrusions) of the second member as necessary.

For example, the multiple protrusions that provide the cushioning properties are preferably flat plate-shaped protrusions whose transverse section parallel to the plate portion has an elongated shape such as an oblong rectangular shape. However, the transverse section of the protrusion may have various shapes such as a square, a circle, an ellipse, and an arc-shaped curve. The section of the protrusion along the direction in which the protrusion protrudes may have a continuously changing shape like such a tapered shape that the sectional area of the protrusion decreases toward the distal end. All of the multiple protrusions may have the same shape. However, a plurality of kinds of protrusions having different shapes may be combined.

For example, the protrusions are arranged in a grid pattern of multiple polygons in which each adjacent pair of the polygons have a common side that is common to the pair of the polygons, so that the protrusions are each located on each side or each corner of the polygons. For example, the grid pattern is a succession of equilateral triangles, squares, or regular hexagons of the same shape as the polygons. However, the grid pattern may be a succession of oblong rectangles, rhombuses, parallelograms, scalene triangles, hexagons with unequal sides, etc. The protrusions can be arranged in various grid patterns such as a grid pattern in which a plurality of kinds of polygons are regularly repeated, and a grid pattern in which a plurality of kinds of polygons are irregularly arranged so as to be adjacent to each other. The multiple protrusions may be randomly arranged.

For example, the protrusions are arranged so that one protrusion is located on each side of the polygons. However, two or more protrusions may be located on each side of the polygons. In the case where the polygon is a polygon whose sides have different lengths such as a rectangle or a parallelogram, the number of protrusions may be different between the long side and the short side. For example, in the case where the protrusions have an elongated shape in transverse section, the protrusions are formed in such an attitude that their longitudinal directions are parallel to the sides of the polygons. However, the protrusions may be formed in such an attitude that their longitudinal directions are perpendicular to the sides of the polygons, or may be formed in such a tilted attitude that their longitudinal directions are tilted at a predetermined angle with respect to the sides of the polygons. The protrusions may be formed so that their longitudinal directions are either parallel or perpendicular to the sides of the polygons depending on the positions of the protrusions in the grid pattern.

In order to improve a soft feel, it is desirable that the multiple protrusions that are formed to be interspersed on the plate portion be arranged at predetermined intervals depending on the height of the protrusions so that the protrusions do not interfere with each other when flexurally deformed. However, for example, the multiple protrusions may be arranged such that a plurality of protrusions interfere with each other in a predetermined deformation stage.

For example, each protrusion is formed in such an attitude that the centerline of the protrusion is tilted along the entire length from the base end portion to the distal end of the protrusion by a given tilt angle α with respect to the direction normal to the plate portion. However, the tilt angle α may be varied continuously or stepwise. Each protrusion may include a perpendicular portion partially parallel to the normal direction. For example, the base end portion of the protrusion may be parallel to the normal direction and only the distal end portion of the protrusion may be tilted with respect to the normal direction. In the case where the entire protrusion is tilted at a given tilt angle α, an appropriate tilt angle α is 10° or more, and a desirable tilt angle α is 15° or more. Since the tilt angle α of more than 30° degrades cushioning performance (such as a stroke), an appropriate tilt angle α is 30° or less. When the protrusion perpendicular to the plate portion is used, a stepped portion may be formed in one sidewall in a predetermined longitudinal section of the protrusion so that a part of the protrusion which is located on the distal end side of the stepped portion is left on the opposite side of the protrusion from the stepped portion. In this case, when a compressive load is applied in the axial direction, the distal end portion of each protrusion unevenly contacts the mating surface and an offset load is applied thereto. The distal end portion thus slides in the opposite direction (the one direction) from the stepped portion, causing flexural deformation of the protrusion. A greatly tilted surface may be formed instead of the stepped portion.

When the surface roughness Ra of the mating surface is less than 0.20, the protrusions smoothly slide on the mating surface, which effectively restrains generation of abnormal noise. In order to further reduce abnormal noise, the surface roughness Ra of the mating surface is desirably 0.17 or less, and more desirably 0.15 or less. The surface roughness Ra of the mating surface corresponds to a molding surface of a mold for molding the second member. Accordingly, the surface roughness Ra of the mating surface may be made to be 0.20 or less by making the molding surface smooth by polishing etc. Since the mating surface is relatively flat, the molding surface can be made smooth by polishing. However, since it is difficult to polish the molding surface for the protrusions, an NC cut surface, for example, is used as it is to mold the protrusions.

In order to make the protrusions slide more smoothly, a lubricant may be contained in one or both of the first member and the second member. For example, the lubricant is preferably a silicone lubricant, a wax lubricant, or a polytetrafluoroethylene (PTFE) lubricant, and about 1 to 10 wt % of the lubricant is contained. The mating surface or the surfaces of the protrusions may be coated with a lubricant such as silicone spray or a polyethylene film etc. may be formed on the mating surface.

For example, the laminated composite interior part of the present invention is preferably applied to plate-shaped panel parts. Specifically, for example, the laminated composite interior part of the present invention is configured so that (a) the second member is a surface layer member, (b) the first member is a plate-shaped base member made of a resin material harder than the second member, and (c) a front surface of the base member serves as the mating surface, and the surface layer member is placed on the front surface of the base member and is fixedly attached to the base member. In this case, (d) a surface member may be firmly fixed to the opposite surface of the plate portion of the surface layer member from the surface on which the protrusions are formed, so that the laminated composite interior part has a three-layer structure of the surface member, the surface layer member, and the plate-shaped base member. Alternatively, the laminated composite interior part of the present invention may be configured so that (a) the first member is a plate-shaped surface layer member made of an elastically deformable resin material, and (b) the second member is firmly fixed to a plate-shaped base member so that the back surface of the plate portion, namely the opposite surface of the plate portion from the surface on which the protrusions are formed, closely contacts the base member.

EMBODIMENTS

Embodiments of the present invention will be described in detail below with reference to the accompanying drawings. The figures in the following embodiments are shown simplified or deformed as appropriate for the purpose of illustration, and each part is not necessarily drawn at an accurate dimensional ratio, in an accurate shape, etc.

Figure 2:
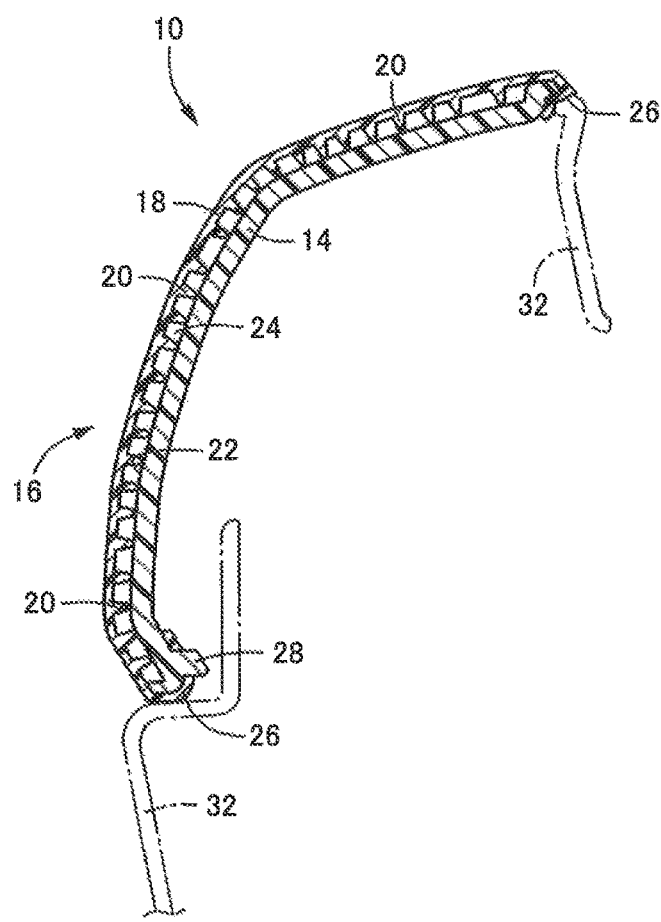
FIG. 2 is an enlarged sectional view taken along line II-II and viewed in the direction of arrows II-II in FIG. 1.
Figure 3:
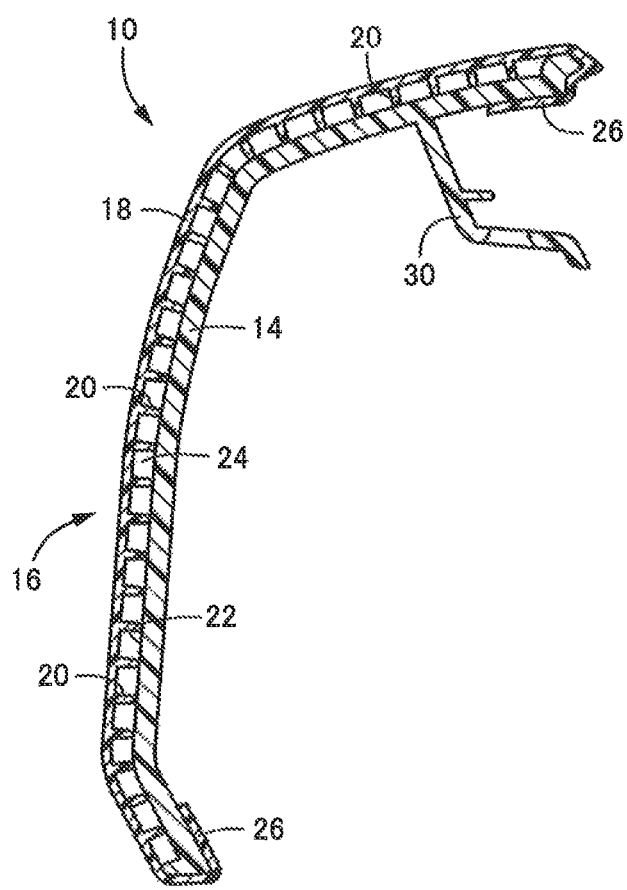
FIG. 3 is an enlarged sectional view taken along line and viewed in the direction of arrows in FIG. 1.

FIG. 1 is a schematic front view showing a shoulder portion (a lower end portion of a window) at the upper end of a vehicle door trim 12 having an ornament 10 to which the present invention is applied, as viewed from the design surface side, namely from the interior side, of a right door of a vehicle. FIG. 2 is a longitudinal section of the ornament 10 taken along line II-II and viewed in the direction of arrows II-II in FIG. 1. FIG. 3 is a longitudinal section of the ornament 10 taken along line III-III and viewed in the direction of arrows III-III in FIG. 1. The ornament 10 is a laminated composite interior part formed by a plate-shaped base member 14 and a surface layer member 16 placed on a front surface 22 of the base member 14 so as to be substantially parallel to the front surface 22. The ornament 10 corresponds to the plate-shaped panel part, and the front surface 22 of the base member 14 corresponds to the mating surface. The surface layer member 16 is the second member and is molded as a single-piece member with a relatively soft, elastically deformable synthetic resin material such as soft polyvinyl chloride. The surface layer member 16 has a plate portion 18 substantially parallel to the front surface 22, and multiple fine protrusions 20 that protrude toward the front surface 22 of the base member 14 are formed integrally with the plate portion 18 on the back surface of the plate portion 18. An outer peripheral terminal portion 26 of the plate portion 18 wraps around an outer peripheral edge portion of the base member 14 such that these fine protrusions 20 create a space 24 between the plate portion 18 and the front surface 22 and the distal ends of the fine protrusions 20 closely contact the front surface 22. The surface layer member 16 is thus fixedly attached to the base member 14. The fine protrusions 20 correspond to the protrusions.

The base member 14 corresponds to the first member and is molded as a single-piece member with a synthetic resin material harder than the surface layer member 16 such as polypropylene. The terminal portion 26 is hooked and held by a plurality of hook protrusions 28 formed on an outer peripheral edge portion of the back surface of the base member 14. A plurality of attachment engagement portions 30 are also formed integrally with the base member 14 on the back surface of the base member 14, and the ornament 10 is fixedly attached to the vehicle door trim 12 via the attachment engagement portions 30. With the ornament 10 thus being fixedly attached to the vehicle door trim 12 via the attachment engagement portions 30, the terminal portion 26 is pressed against the outer peripheral edge portion of the base member 14 by a plurality of holding portions 32 of the vehicle door trim 12, so that the terminal portion 26 is held around the outer peripheral edge portion of the base member 14. The terminal portion 26 may be fixed to a peripheral edge portion of the base member 14 by other fixing means such as an adhesive.

Figure 4A:
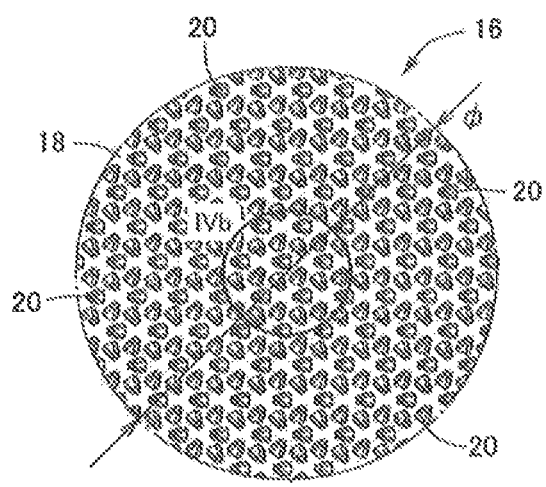
FIGS. 4A and 4B illustrate multiple fine protrusions formed on the back surface of a surface layer member.
Figure 4B:
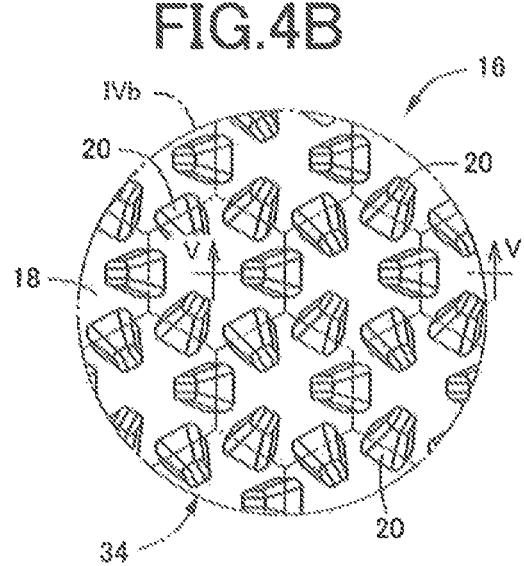
Figure 5:
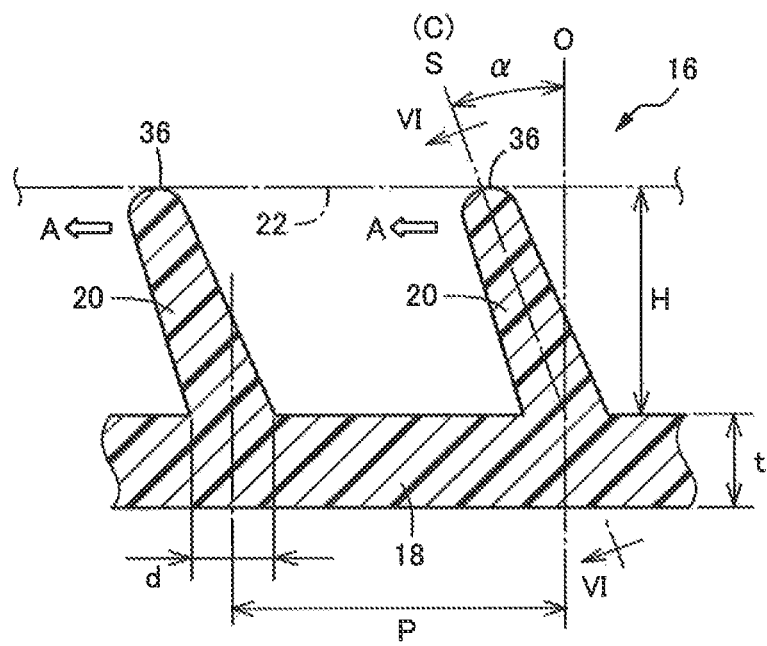
FIG. 5 is an enlarged longitudinal section taken along line V-V and viewed in the direction of arrows V-V in FIG. 4B.
Figure 6:
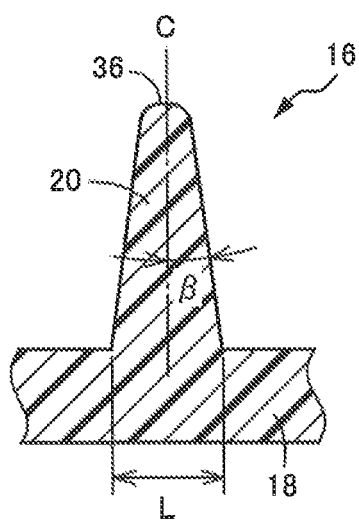
FIG. 6 is a longitudinal section taken along line VI-VI and viewed in the direction of arrows VI-VI in FIG. 5.
Figure 7:
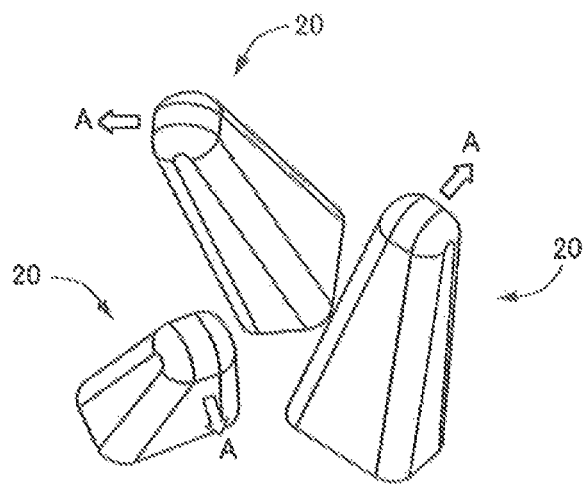
FIG. 7 is a perspective view of the fine protrusions shown in FIGS. 4A and 4B, in which the directions in which the fine protrusions are flexurally deformed are shown by white arrows A.

FIGS. 4A and 4B illustrate the multiple fine protrusions 20 formed on the back surface of the surface layer member 16. FIG. 4A is a plan view of the fine protrusions 20 in a size close to their actual size (diameter ϕ=50 mm), and FIG. 4B is an enlarged plan view of a central portion IVb in FIG. 4A. These plan views show the multiple fine protrusions 20 as viewed in the direction perpendicular to the plate portion 18, and the multiple fine protrusions 20 are formed so as to be densely distributed. FIG. 5 is an enlarged longitudinal section taken along line V-V and viewed in the direction of arrows V-V in FIG. 4B, namely a sectional view along the thickness direction of the fine protrusions 20. FIG. 6 is a longitudinal section taken along line VI-VI and viewed in the direction of arrows VI-VI in FIG. 5, namely a sectional view along the lateral direction, taken along a neutral plane S extending along the tilt of the fine protrusion 20. FIG. 7 is a perspective view of the plurality of fine protrusions 20 as viewed obliquely from above. As can be seen from these figures, the multiple fine protrusions 20 have the same shape, and have an elongated shape in their transverse sections parallel to the plate portion 18. The multiple fine protrusions 20 are arranged in a grid pattern 34 of multiple polygons in which each adjacent pair of the polygons have a common side that is common to the pair of the polygons, and are positioned in respective positions defining the respective sides of the polygons. The fine protrusions 20 are each formed on each side of the polygons in such an attitude that the longitudinal direction of the transverse section of each fine protrusion 20 is substantially parallel to a corresponding one of the sides of the polygons. In the present embodiment, the fine protrusions 20 have an oblong rectangular shape with four rounded corners in their transverse sections and are disposed in such an attitude that the longitudinal direction of the oblong rectangular transverse section of each fine protrusion 20 matches a corresponding one of the sides of the polygons. As shown by long dashed double-short dashed lines in FIG. 4B, the grid pattern 34 is a honeycomb pattern, namely a succession of the polygons in the form of regular hexagons of a given size, and the fine protrusions 20 are formed so that one fine protrusion 20 is located on the middle part of each side of the regular hexagons.

Each of the fine protrusions 20 has the shape of a plate having a substantially oblong rectangular transverse section and has a gently tapered shape such that its sectional area decreases toward its distal end portion 36. As can be seen from FIG. 5, the neutral plane S in the thickness direction of the plate shape is tilted along the entire length from the base end portion to the distal end portion 36 of the fine protrusion 20 by a tilt angle α with respect to a direction O normal to the plate portion 18 located in the base end portion of the fine protrusion 20. The neutral plane S is a plane connecting, in the axial direction of the fine protrusion 20, neutral lines bisecting the thickness of the fine protrusion 20 in the transverse sections of the fine protrusion 20 which are parallel to the plate portion 18. The neutral plane S includes a centerline C connecting, in the axial direction of the fine protrusion 20, the central points (centers of gravity) of the transverse sections of the fine protrusion 20 which are parallel to the plate portion 18. The plate portion 18 is substantially parallel to the front surface 22 of the base member 14. Accordingly, in a relatively small region near each fine protrusion 20, the direction O normal to the plate portion 18 substantially matches a direction normal to the front surface 22. The distal end portion 36 of the fine protrusion 20 thus contacts the front surface 22 in an attitude tilted at substantially the same angle as the tilt angle α. The tilt angle α is 10° a 30°, and in the present embodiment, about 20°. The distal end portion 36 of the fine protrusion 20 having the shape of a plate has the shape of a partial cylinder smoothly curved to define an arc shape in the longitudinal section along the thickness direction in FIG. 5, and is smoothly rounded at its both end portions in the longitudinal section along the lateral direction in FIG. 6. This allows the distal end portion 36 of the fine protrusion 20 to smoothly slide on the front surface 22 in one direction A, namely the direction in which the fine protrusion 20 is tilted.

The fine protrusions 20 will be more specifically described. A pitch P that is an interval between mutually parallel two sides of each regular hexagon of the grid pattern 34, namely the distance between the centers of the respective fine protrusions 20 disposed on these two sides, is 4.0 mm≤P≤9.0 mm, and in the present embodiment, about 7.0 mm. The height dimension H of the fine protrusion 20 is 2.0 mm≤H≤5.0 mm, and in the present embodiment, about 3.3 mm. The thickness dimension d of the base end portion of the fine protrusion 20 having the shape of a plate with an oblong rectangular section is 1.0 mm≤d≤2.0 mm, and in the present embodiment, about 1.2 mm. The lateral dimension L (the longitudinal dimension of the oblong rectangular transverse section) of the base end portion of the fine protrusion 20 is 1.5 mm≤L≤2.5 mm and is larger than the thickness dimension d. In the present embodiment, the lateral dimension L is about 1.8 mm. A tilt angle β of both side surfaces in the lateral direction (the longitudinal direction of the oblong rectangular transverse section) of the fine protrusion 20 with respect to the direction in which the fine protrusion 20 protrudes is 5°≤β≤15°, and in the present embodiment, about 7°. The fine protrusion 20 is symmetrical with respect to the centerline C. The thickness t of the plate portion 18 is 1.0 mm≤t≤2.0 mm, and in the present embodiment, about 1.5 mm.

Figure 8A:
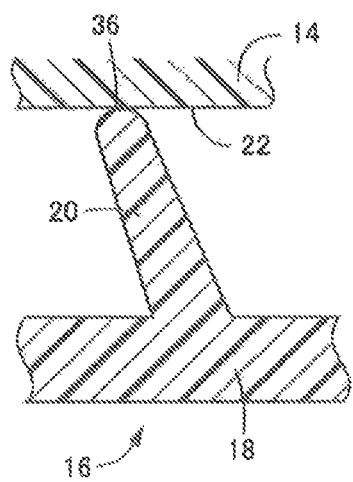
FIGS. 8A to 8C show longitudinal sections corresponding to FIG. 5, illustrating how the fine protrusions are deformed when the surface layer member is pressed with a pressing load F.
Figure 8B:
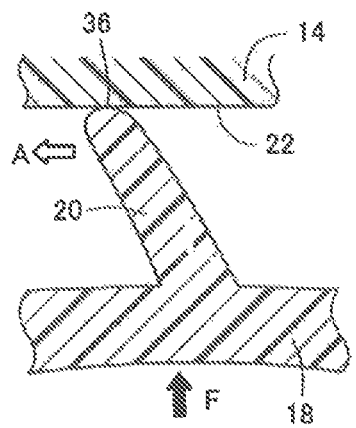
Figure 8C:
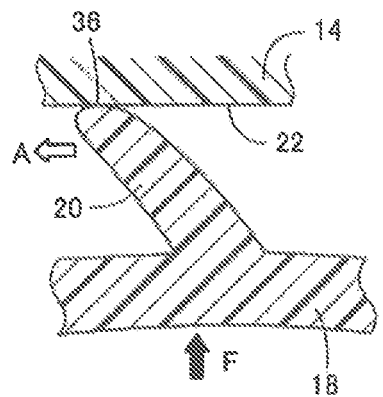

When the plate portion 18 of the surface layer member 16 of such an ornament 10 is pressed with a finger or hand, the distal end portions 36 of the fine protrusions 20 are pressed against the front surface 22 of the base member 14, whereby the fine protrusions 20 are elastically deformed so as to buckle. This elastic deformation provides cushioning properties and thus provides a predetermined tactile feel. That is, since each fine protrusion 20 is tilted in the one direction A about its axis perpendicular to the plate portion 18, the distal end portion 36 in contact with the front surface 22 slides in the one direction A, i.e., the direction in which the fine protrusion 20 is tilted, specifically the left direction in FIGS. 8A to 8C, when a pressing load F is applied to the plate portion 18 in a direction substantially perpendicular to the plate portion 18, as sequentially shown in FIGS. 8A, 8B, and 8C. This sliding movement causes bending deformation of the fine protrusions 20 in the one direction A or causes elastic flexural deformation of the fine protrusions 20 so that the fine protrusions 20 buckle in the one direction A, thereby providing a soft feel (cushioning properties). The dimensions and angles of each part of the fine protrusion 20 are determined as appropriate in view of the material of the surface layer member 16 etc. so as to provide a predetermined tactile feel (soft feel, rigid feel, etc.), strength, etc.

When friction between the fine protrusions 20 and the front surface 22 is high, the sliding movement of the fine protrusions 20 in the one direction A is inhibited and abnormal noise is generated by stick-slip in some cases. Accordingly, in the present embodiment, the molding surface of a mold for molding the base member 14 is made smooth by polishing etc. so that surface roughness Ra of the front surface 22 is less than 0.20. Specifically, the surface roughness Ra of the front surface 22 is 0.17 or less, and in the present embodiment, about 0.05. The friction between the fine protrusions 20 and the front surface 22 is thus reduced, so that the fine protrusions 20 are flexurally deformed while smoothly sliding in the one direction A. This suppresses abnormal noise and also provides an excellent tactile feel. Since it is difficult to polish the molding surface of a mold for the fine protrusions 20, an NC cut surface is used as it is to mold the fine protrusions 20 in the present embodiment.

Figure 9:
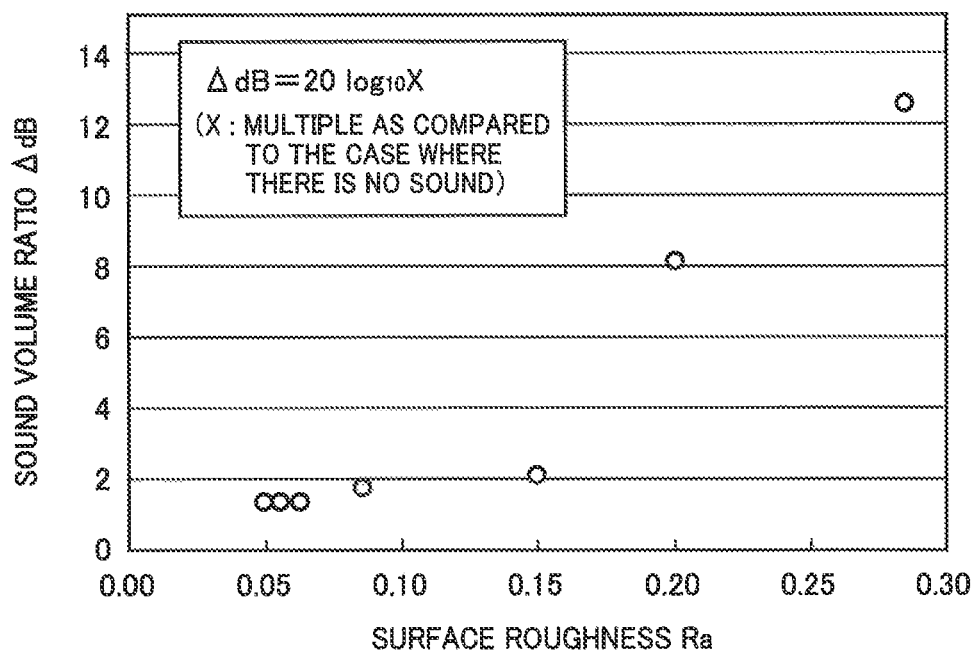
FIG. 9 is a graph illustrating the measurement results of abnormal noise for various surface roughnesses Ra of the front surface of a base member.

Flat samples (60 mm×60 mm) configured similarly to the ornament 10 of the present embodiment were prepared with various surface roughnesses Ra of the front surface 22 of the base member 14, and abnormal noise generated at the time of pressing was recorded with a sound collecting microphone. FIG. 9 is a graph showing comparison of the maximum value of the abnormal noise among the samples. The sound volume ratio ΔdB substantially represents the magnitude of abnormal noise. When the surface roughness Ra is less than 0.20, the magnitude of abnormal noise is significantly smaller than when the surface roughness Ra is 0.20 or more.

As described above, the ornament 10 of the present embodiment is configured so that each fine protrusion 20 is flexurally deformed in the one direction A about its axis, and the surface roughness Ra of the front surface 22 is less than 0.20. Accordingly, friction between the front surface 22 and the fine protrusions 20 is reduced and the fine protrusions 20 smoothly slide in the one direction A, whereby generation of abnormal noise due to stick-slip is effectively restrained.

The fine protrusions 20 are formed in a tilted attitude so that the fine protrusions 20 are tilted in the one direction A at the tilt angle α of 10° to 30° with respect to the direction normal to the plate portion 18. The fine protrusions 20 are thus more reliably flexurally deformed while sliding in the one direction A. Moreover, since the surface roughness Ra of the front surface 22 is less than 0.20, the fine protrusions 20 more smoothly slide in the one direction A, and generation of abnormal noise can be more stably restrained. Since the tilt angle α is in the range of 10° to 30°, stick-slip can be appropriately restrained while predetermined cushioning performance is ensured.

In order to make the fine protrusions 20 slide more smoothly, a lubricant such as a silicone lubricant may be contained in one or both of the base member 14 and the surface layer member 16, or the front surface 22 may be coated with silicone spray etc. or a polyethylene film etc. may be formed on the front surface 22.

Other embodiments of the present invention will be described. In the following embodiments, substantially the same portions as those of the above embodiment are denoted with the same reference characters, and detailed description thereof will be omitted.

Figure 10:
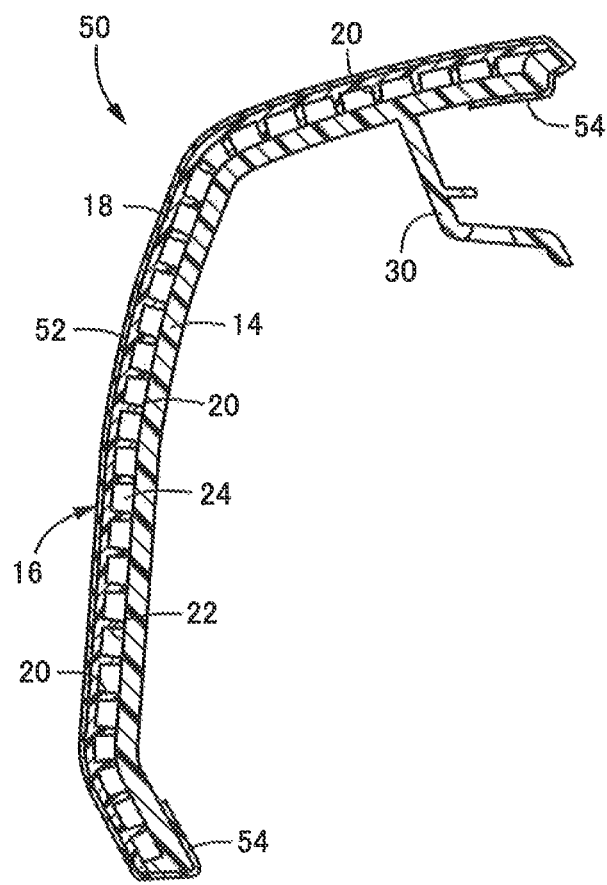
FIG. 10 is a sectional view corresponding to FIG. 3, illustrating an embodiment in which a surface member is fixed to a surface layer member.

An ornament 50 of FIG. 10 is different from the ornament 10 in that a surface member 52 is firmly fixed to the front surface of the surface layer member 16, namely one of opposite surfaces of the plate portion 18, which is remote from the fine protrusions 20 that are formed on the plate portion 18, so that the ornament 50 includes the surface member 52, the surface layer member 16, and the plate-shaped base member 14 to constitute a three-layer structure as a whole. For example, the surface member 52 is made of woven fabric, nonwoven fabric, knitted fabric, vinyl chloride, a flexible film, etc. Molding the surface member 52 integrally with the surface layer member 16 allows the surface member 52 to be molded simultaneously with the surface layer member 16 and to be firmly fixed to the front surface of the surface layer member 16. An outer peripheral terminal portion 54 of the surface member 52 wraps around the outer peripheral edge portion of the base member 14 and is hooked and held by the hook protrusions 28, not shown. With the ornament 50 being fixedly attached to the vehicle door trim 12, the terminal portion 54 is pressed against the outer peripheral edge portion of the base member 14 by the holding portions 32. The surface layer member 16 together with the surface member 52 is thus fixedly attached to the base member 14.

Such an ornament 50 has functions and effects which are similar to those of the ornament 10. Moreover, since the surface layer member 16 is covered with the surface member 52, sink marks, flashing, etc., if any, on the above-described one of the opposite surfaces of the plate portion 18 of the surface layer member 16, which is remote from the fine protrusions 20 that are formed on the plate portion 18 are not exposed to the outside, and scratches on the surface layer member 16 are prevented. This expands the choice of resin materials for the surface layer member 16 and increases flexibility in design of the shape of the fine protrusions 20 etc. which relates to the tactile feel. The tactile feel can thus be adjusted more easily and appropriately.

Figure 11:
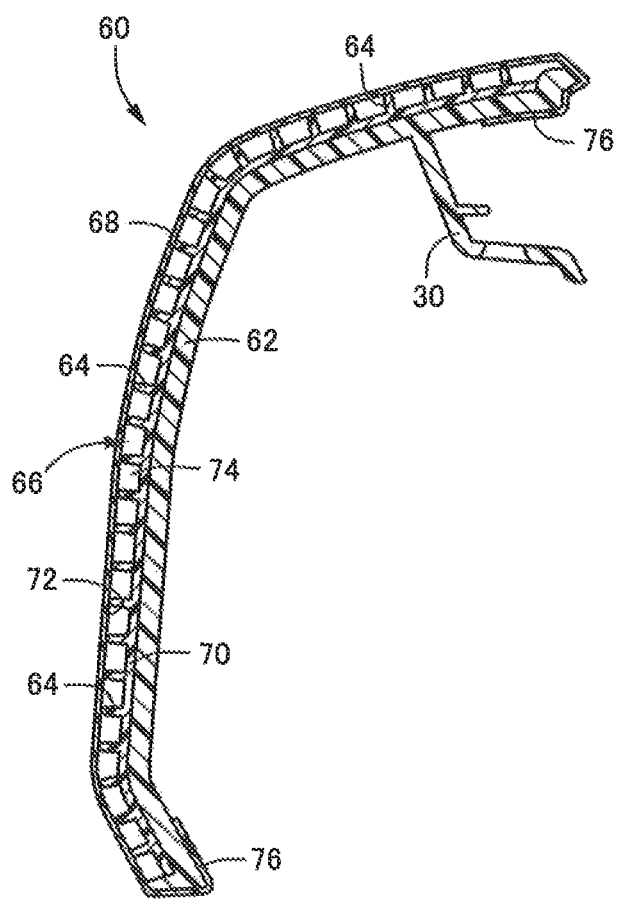
FIG. 11 is a sectional view corresponding to FIG. 3, illustrating an embodiment in which a first member is a surface layer member and a second member is fixed to a base member.

In an ornament 60 of FIG. 11, a cushioning member 66 having multiple fine protrusions 64 is disposed on the front surface of a plate-shaped base member 62, and a surface layer member 68 is attached so as to be superposed on the fine protrusion 64 side of the cushioning member 66. Like the base member 14, the base member 62 is made of a relatively hard synthetic resin material, and the hook protrusions 28, not shown, and the attachment engagement portions 30 are formed integrally with the base member 62 on the back surface of the base member 62. The cushioning member 66 corresponds to the second member. The cushioning member 66 is made of an elastically deformable synthetic resin material like the surface layer member 16, and has a plate portion 70 that is firmly fixed to the front surface of the base member 62 so as to be in close contact therewith, and multiple fine protrusions 64 are formed integrally with the plate portion 70. For example, the fine protrusions 64 are configured similarly to the fine protrusions 20. The fine protrusions 64 are formed so as to protrude obliquely from the plate portion 70 toward the surface layer member 68 at the tilt angle α so that a space 74 is defined between a back surface 72 of the surface layer member 68 and the plate portion 70, and the distal end portions of the fine protrusions 64 are in close contact with the back surface 72. The back surface 72 corresponds to the mating surface. The surface layer member 68 corresponds to the first member. In the present embodiment, the surface layer member 68 is made of a relatively soft synthetic resin material like the surface layer member 16. The surface roughness Ra of the back surface 72 is less than 0.20, and in the present embodiment, about 0.05. An outer peripheral terminal portion 76 of the surface layer member 68 wraps around the outer peripheral edge portion of the base member 62 and is hooked and held by the hook protrusions 28, not shown. With the ornament 60 being fixedly attached to the vehicle door trim 12, the terminal portion 76 is pressed against the outer peripheral edge portion of the base member 62 by the holding portions 32. The surface member 52 may further be disposed on the surface layer member 68.

When the surface layer member 68 of such an ornament 60 is pressed with a finger or hand, the back surface 72 of the surface layer member 68 is pressed against the distal end portions of the fine protrusions 64 of the cushioning member 66. The fine protrusions 64 are thus elastically deformed, providing an excellent tactile feel. Since the surface roughness Ra of the back surface 72 is less than 0.20, friction between the back surface 72 and the fine protrusions 64 is reduced, and the fine protrusions 64 smoothly slide in one direction. The ornament 60 thus has effects similar to those of the ornament 10. For example, generation of abnormal noise due to stick-slip is effectively restrained. Since the cushioning member 66 having the fine protrusions 64 is covered with the surface layer member 68 and the plate portion 70 of the cushioning member 66 is fixed to the base member 62, sink marks, flashing, etc., if any, on a surface of the plate portion 70 of the cushioning member 66, which is remote from the fine protrusions 64 that are formed on the plate portion 70 are not exposed to the outside. This expands the choice of resin materials for the cushioning member 66 and increases flexibility in design of the shape of the fine protrusions 64 etc. which relates to the tactile feel. The tactile feel can thus be adjusted more easily and appropriately.

Figure 12:
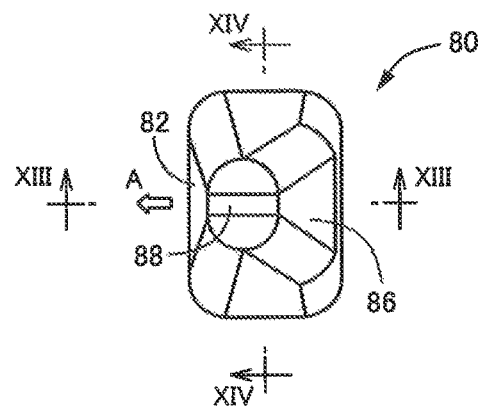
FIG. 12 is a plan view of another example of the fine protrusions.
Figure 13:
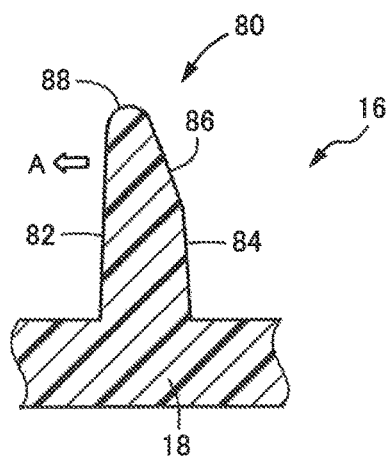
FIG. 13 is a longitudinal section taken along line and viewed in the direction of arrows in FIG. 12.
Figure 14:
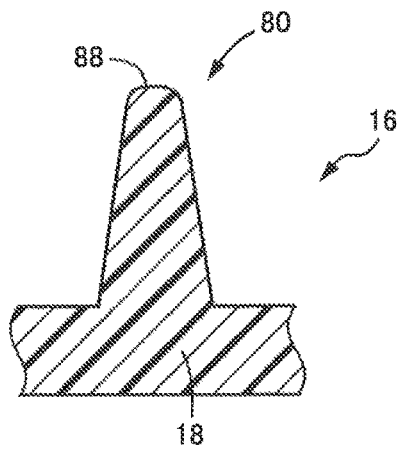
FIG. 14 is a longitudinal section taken along line XIV-XIV and viewed in the direction of arrows XIV-XIV in FIG. 12.

FIGS. 12 to 14 are views illustrating fine protrusions 80 that are preferably used instead of the fine protrusions 20. FIG. 12 is a plan view of the fine protrusion 80, FIG. 13 is a longitudinal section of the fine protrusion 80 taken along line XIII-XIII and viewed in the direction of arrows in FIG. 12, and FIG. 14 is a longitudinal section of the fine protrusion 80 taken along line XIV-XIV and viewed in the direction of arrows XIV-XIV in FIG. 12. Like the fine protrusion 20, the fine protrusion 80 has the shape of a plate having a substantially oblong rectangular transverse section. However, the fine protrusion 80 is formed so as to stand substantially perpendicularly to the plate portion 18. Moreover, the fine protrusion 80 has a greatly tilted surface 86, tilted at a large tilt angle, on the distal end portion 88 side of one of right and left sidewalls 84, 82 in the longitudinal section of FIG. 13, namely the sidewall 84. The fine protrusion 80 thus has an asymmetrical shape in the longitudinal section of FIG. 13. Accordingly, when a compressive load is applied in the axial direction, an offset load is applied to the left side of the fine protrusion 80 in FIG. 13, namely the opposite side of the fine protrusion 80 from the greatly tilted surface 86. The distal end portion 88 that is relatively pressed against the front surface 22 thus slides in the one direction A, causing bending deformation of the fine protrusion 80 in the one direction A or causing elastic flexural deformation of the fine protrusion 80 so that the fine protrusion 80 buckles in the one direction A.

Figure 15:
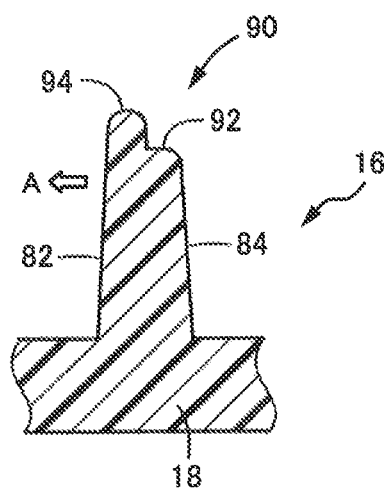
FIG. 15 is a longitudinal section corresponding to FIG. 13, illustrating still another example of the fine protrusions.

FIG. 15 is a longitudinal section corresponding to FIG. 13, illustrating still another example of the fine protrusions. Each fine protrusion 90 has a stepped portion 92 instead of the greatly tilted surface 86, and a distal end portion 94 with a sectional area reduced substantially by half is left on the sidewall 82 side of the fine protrusion 90. Accordingly, in this case as well, when the distal end portion 94 is pressed against the front surface 22 and a compressive load is applied in the axial direction, an offset load is applied to the left side of the fine protrusion 90 in FIG. 15, namely the opposite side of the fine protrusion 90 from the stepped portion 92. The distal end portion 94 thus slides in the one direction A like the fine protrusion 80, causing bending deformation of the fine protrusion 90 in the one direction A or causing elastic flexural deformation of the fine protrusion 90 so that the fine protrusion 90 buckles in the one direction A.

The ornament 60 of FIG. 11 may also have the fine protrusions 80 or 90 instead of the fine protrusions 64.

Although the embodiments of the present invention are described in detail above based on the drawings, the embodiments are shown by way of example only, and the present invention can be embodied in various modified or improved forms based on the knowledge of those skilled in the art.

REFERENCE SIGNS LIST 10, 50, 60: Ornament (Laminated composite interior part) 14: Base member (First member) 16: Surface layer member (Second member) 18, 70: Plate portion 20, 64, 80, 90: Fine protrusion (Protrusion) 22: Front surface (Mating surface) 24, 74: Space 36, 88, 94: Distal end portion 66: Cushioning member (Second member) 68: Surface layer member (First member) 72: Back surface (Mating surface) C: Centerline O: Normal direction

The invention claimed is:

1. A laminated composite interior part, comprising:
a first member made of a synthetic resin and having a mating surface; and
a second member which is made of an elastically deformable synthetic resin, and which has a plate portion substantially parallel to the mating surface, the plate portion being provided with multiple protrusions which are formed integrally with the plate portion to be interspersed on the plate portion, and which protrude toward the mating surface such that the plate portion and the mating surface cooperate to define a space between the plate portion and the mating surface, and the second member being placed on the first member with distal end portions of the protrusions being in contact with the mating surface,
the laminated composite interior part having cushioning properties provided by elastic deformation of the protrusions, which is to be caused as the distal end portions of the protrusions are relatively pressed against the mating surface,
flexural rigidity of each of the protrusions against a compressive load being anisotropic about its axis, so that the protrusion is flexurally deformed in one direction about its axis with the distal end portion thereof sliding on the mating surface,
the multiple protrusions being positioned on all sides of multiple polygons such that at least one of the multiple protrusions is placed on each of the respective sides of the multiple polygons, the multiple polygons having the same shape and size that cooperate to form a grid pattern in which each adjacent pair of the multiple polygons have a common side that is common to the each adjacent pair of the multiple polygons,
the each of the multiple protrusions being positioned on each of the sides of a corresponding one of the multiple polygons in an attitude that causes the each of the multiple protrusions to be bent inward or outward of the corresponding one of the multiple polygons, such that each of the multiple protrusions positioned on the sides of each of the multiple polygons is bent in an opposite direction to a direction in which both adjacent protrusions of the each of the multiple protrusions are bent,
and surface roughness Ra of the mating surface being less than 0.20 μm.

2. The laminated composite interior part according to claim 1, wherein
the protrusion has an asymmetrical longitudinal section, and the protrusion is flexurally deformed while sliding in the one direction determined according to the asymmetrical shape when the distal end portion thereof is pressed against the mating surface.

3. The laminated composite interior part according to claim 1, wherein
the protrusion has its centerline tilted with respect to a direction normal to the plate portion located at a base end portion of the protrusion, and the protrusion is flexurally deformed while sliding to a side to which the centerline is tilted.

4. The laminated composite interior part according to claim 1,
wherein the multiple protrusions consist of a plurality of pairs of protrusions, each of the pairs of protrusions consisting of two protrusions that are adjacent to each other,
wherein the multiple protrusions are arranged such that at least one of the two protrusions is to be flexurally deformed in, as said one direction, a direction including a component of a direction away from the other of the two protrusions, and
wherein, when flexurally deformed, the multiple protrusions do not interfere with each other.

5. The laminated composite interior part according to claim 1, wherein the surface roughness Ra of the mating surface is in a range of 0.05 to 0.15 µm.

6. The laminated composite interior part according to claim 1, wherein the multiple protrusions are all of the protrusions of the plate portion, and the multiple protrusions never interfere with each other when flexurally deformed.

* * * * *